United States Patent [19]

Scott et al.

[11] Patent Number: 4,880,473
[45] Date of Patent: Nov. 14, 1989

[54] PROCESS FOR THE PRODUCTION OF FERMENTABLE SUGARS FROM BIOMASS

[75] Inventors: Donald S. Scott; Jan Piskorz, both of Waterloo, Canada

[73] Assignee: Canadian Patents & Development Ltd., Ottawa, Canada

[21] Appl. No.: 176,681

[22] Filed: Apr. 1, 1988

[51] Int. Cl.$^4$ .............................................. C13K 1/04
[52] U.S. Cl. ........................................ 127/37; 127/1; 536/124; 536/127
[58] Field of Search ...................... 127/37, 1; 585/240, 585/242; 536/124, 127

[56] References Cited

U.S. PATENT DOCUMENTS

| | | | |
|---|---|---|---|
| 2,752,270 | 6/1956 | Specht | 127/37 |
| 2,801,939 | 8/1957 | Hignett et al. | 128/37 |
| 4,281,063 | 7/1981 | Tsao et al. | 127/37 |

FOREIGN PATENT DOCUMENTS 00935 2/1988 World Int. Prop. O. .......... 585/240

*Primary Examiner*—H. M. S. Sneed
*Assistant Examiner*—Chung K. Pak
*Attorney, Agent, or Firm*—Juliusz Szereszewski

[57] ABSTRACT

A process for the production of fermentable sugars from wood or other cellulose-containing biomasses, comprises the steps of (a) hydrolysing the biomass with a dilute sulfuric acid to dissolve hemicellulose while leaving most of cellulose in a solid phase, (b) separating the cellulose-containing solid phase, (c) subjecting the solid phase to rapid pyrolysis at a temperature of 400°–600° C. at atmospheric pressure, preferably in a fluidized bed reactor with a short vapor residence time, to obtain a crude pyrolysis product by condensing the pyrolytic vapors, (d) adjusting the water content of the crude product to form an aqueous phase with high carbohydrate content and a water-insoluble phase containing lignin-derived material, and (e) separating the aqueous phase. Optionally, the aqueous phase may be purified, e.g. by absorption.

8 Claims, 1 Drawing Sheet

PROCESS FOR THE PRODUCTION OF FERMENTABLE SUGARS FROM BIOMASS

BACKGROUND OF THE INVENTION

This invention relates to a process for the production of fermentable sugars such as glucose from wood or other biomasses.

It is known to pyrolyze pure cellulosE slowly at a low pressure at temperatures below 500° C. to obtain a good yield of levoglucosan and other sugars or anhydrosugars. However, the use of wood for such pyrolysis results in poor yields of anhydrosugars such as levoglucosan. If hemicellulose is removed from the wood by acid treatment prior to the pyrolysis step, levoglucosan yields of up to 50% of the cellulose content can be obtained by slow heating under low pressure. However, at atmospheric pressure yields of levoglucosan are much lower, less than half of that obtained under vacuum. Further, smaller amounts of many other compounds are also present in the slow vacuum pyrolysis product. Among these are phenols from the lignin fraction of the wood, and furfural and its derivatives. Also, in the process of vacuum pyrolysis, the majority of the lignin content of the wood becomes converted to a solid char, suitable mainly for use as a fuel.

It is also known from U.S. Pat. No. 4,468,256 (Hinger) to produce glucose from vegetable raw materials by impregnating the raw material with dilute acid and subsequent heating to a temperature of above 250° C. by means of high pressure steam. This heating step takes place in an extremely short time accompanied by a sudden pressure rise.

Generally, known methods of preparing fermentable sugar solutions from cellulosic material require digestion in acid. If this digestion is done using a strong acid, many undesirable and toxic side products are formed. If weak acid is used, poorer glucose yields and more dilute solutions are obtained. In this context, it is also known to use weak acid treatment of cellulosic raw material followed by enzymatic hydrolysis. This procedure can yield an improved product at higher concentrations compared to weak acid hydrolysis above. However, this process is relatively expensive.

There is a need for a process for producing fermentable sugar solutions from cellulose-containing biomass at a moderate cost and at relatively high yields so that the process may become competitive with other fuel production technologies, when the resulting sugars are a feedstock for alcohol production.

SUMMARY OF THE INVENTION

According to the invention, there is provided a process for the treatment of cellulose-containing biomasses such as wood to obtain among other products, fermentable sugar solutions, the process comprising the steps of (a) treating the biomass with a dilute acid capable of dissolving hemicellulose wherein the time of treatment, temperature and acid strength are selected so as to obtain a liquid phase containing most of the biomass hemicelluloses and a solid-phase containing most of the biomass hemicelluloses and a solid-phase containing most of the biomass cellulose, (b) separating the cellulose-containing solid phase from the liquid phase, (c) subjecting the resulting solid phase to rapid pyrolysis to obtain a crude product containing sugars and anhydrosugars, (d) adjusting water content of the crude product to form an aqueous phase containing relatively high amounts of fermentable carbohydrates and a water-insoluble phase containing lignin derived material, and (e) separating the aqueous phase from the water-insoluble phase.

Suitable acids for treating the biomass include sulfuric acid and other mineral acids such as hydrochloric acid at concentrations in the range of 0.1 to 10% by weight. Preferably, sulfuric acid at concentrations in the range 1–6%, may be used. The time of treatment is 1 to 6 hours and the temperature is in the range 50° C.–150° C., preferably 80° C.–110° C. The weight ratio of acid solution to solid biomass is preferably from 4:1 to 8:1.

Following the above treatment and separation of the solid phase from the liquid phase, the former is washed, dried and comminuted if necessary to facilitate the subsequent pyrolysis step, preferably to particle size of about 5 mm or less. It is the shortest dimension of particles that matters. The pyrolysis step involves so-called flash pyrolysis where the temperature is in the range 400° C.–600° C., preferably at atmospheric pressure.

The conditions of the rapid pyrolysis step should be such as to yield a maximum amount of liquid or semi-liquid product. Such conditions are met, for instance, by a fast pyrolysis process carried out in a fluidized bed reactor where a fluidized bed of sand or another inert solid is used in a mixture with comminuted solid phase of step b), or another reactor where the residence time of pyrolysis vapors is about 2 seconds or less. Advantageously, the pyrolysis in the fluidized bed reactor may be carried out in a continuous manner.

The pyrolytic vapors are condensed to yield a crude product containing usually from 5% to 30% water depending on feed moisture content. The water content of the crude product is adjusted by adding enough water thereto to form an aqueous phase containing a substantial part of water soluble sugars and anhydrosugars obtained by the pyrolysis of cellulose and minor amounts of other organic compounds, and a water-insoluble phase containing primarily aromatic compounds derived from lignin. The water-insoluble phase can be separated from the liquid by filtration or centrifuging and then dried to yield a brown "pyrolytic lignin" product. The post-pyrolytic aqueous phase may contain also small amounts of water soluble compounds such as phenols, furanoid compounds and acids in addition to large yields of carbohydrates.

The usefulness of the aqueous phase containing the non-carbohydrate compounds may be limited as a feedstock for fermentation processes, since phenols and furfurals may be toxic to fermenting microorganisms. It is therefore expedient to remove these undesirable compounds by an adsorption process, e.g. using activated carbon, to prepare a solution of sugars and anhydrosugars suitable for fermentation.

The liquid obtained in step a), i.e. the acid treatment, is an acidic solution of pentoses and other compounds derived from hemicellulose. It may be used repeatedly in the pretreatment step with fresh biomass for each use in order to measure the content of pentoses and to reduce acid costs. There are two ways of utilizing this solution. It may be used separately, e.g. as a source of fermentable sugars, if it is not desirable to mix the pentose and hexose products. Alternatively, the acidic solution can be used to hydrolyse the anhydrosugars in the post-pyrolytic aqueous phase obtained in the step d), using well established technology.

Wood may be considered as a biomass for the purpose of this invention. Other biomasses, such as bark, straw, chaff, peat, seed hulls, and plant stalks of many kinds may also be used, with sugar yields being obtained in proportion to the holocellulose content of the material.

It is important to note that various kinds of biomass, even when derived from different wood types, represent varying contents of cellulose, hemicellulose etc. Accordingly, while some exemplary procedures have been described below in more detail, the choice of a particular biomass determines the conditions to apply to obtain maximum possible yields of fermentable sugars using the process of the invention. This applies, for instance, to the amount of water required to separate the crude pyrolytic product into the two phases.

BRIEF DESCRIPTION OF THE DRAWINGS

In the accompanying drawing.

DETAILED DESCRIPTION OF THE INVENTION

Example 1

Figure 1:
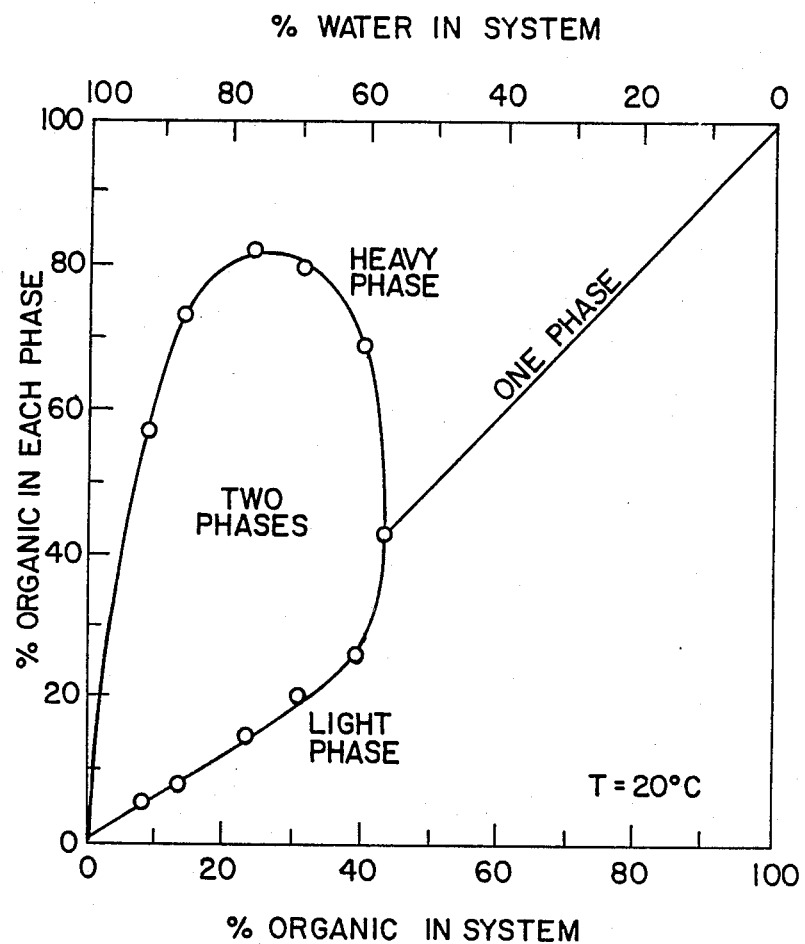
FIG. 1 represents a phase diagram at 25° C. for the product of pyrolysis of poplar wood with water.

To 1 kg of comminuted wood (0.5 mm or less particle size) with moisture content 4.6 % was added 4 kg of 5% sulfuric acid and heated for 2 hours at about 95° C. After this step, the solid biomass was washed, dried to 16.5% moisture, and then fed to a pyrolytic reactor comprising a fluidized bed of sand. The temperature of the fluidized bed was 501° C. The biomass was passed continuously through the fluidized bed at atmospheric pressure so that the residence time of pyrolytic vapors was about 0.4–0.6 seconds. The pyrolytic volatiles were condensed to yield 0.84 kg of crude syrup containing about 20% water. To this syrup was added 1.1 kg water and the resulting solution was separated from the water-insoluble phase by filtration. The solution was passed through an activated carbon column. Approximate concentration of sugars in the solution was 250 grams/liter.

Example 2

To 1 kg of comminuted wood (0.6 mm or less particle size) with moisture content 4.6% was added 4 kg of 1% sulfuric acid and heated for 6 hours at 95° C. Next, the solid biomass was washed, dried to 0.8% moisture and then fed to a pyrolytic reactor comprising a fluidized bed of sand. The temperature of the fluidized bed was 503° C. The biomass was passed continuously through the fluidized bed at atmospheric pressure. The residence time of pyrolytic vapors was about 0.4–0.5 seconds. The pyrolytic volatiles were condensed to yield 0.84 kg of crude syrup containing about 6.9% water. To this syrup was added 1.4 kg water and the resulting solution was separated from the waterinsoluble phase by filtration. The solution was passed through an activated carbon column. The approximate concentration of sugars in the solution was 175 g/l.

It has been determined through a broad test program that the optimum temperature of the pyrolysis step of the invention for maximum yield of crude syrup, is about 500° C. If, following the pretreatment as in Examples 1 or 2, the temperature of the pyrolytic step is lower than 500° C, i.e. in the range of about 400° C.–500° C., lower yields of crude syrup than in Example 2 result and more char is obtained in the pyrolysis byproduct. If the temperature of pyrolysis is above 500° C, the yields of crude syrup are also lower than optimum, and the byproduct consists of comparatively less char, but more gas.

The exact choice of conditions of the process of the invention is a matter of economics. If the yield of fermentable sugars is a main factor, then the conditions close to those of Example 1 should be employed. Alternatively, it may be desired to use lower acid concentrations and correspondingly longer acid treatment times. Obviously, the results depend on a combination of factors, starting from the choice of the raw material. It will be appreciated, however, that the combination of mild acid treatment and rapid pyrolysis as devised by the invention gives higher fermentable sugar yields than the pyrolytic treatment of a raw wood.

A comparison of sugar yields obtained by pyrolysis of untreated wood with yields obtained by pyrolysis of a wood acid-treated according to the invention shows clearly the advantage of the latter. The results are shown in Table 1, where A-1 and A-3 indicate the conditions and results of a process of the invention, while A-2 indicates same data for wood pyrolysis without the acid pretreatment. Not only are the yields of sugars higher in the A-1 or A-3 runs, but also a significant reduction in amounts of non-sugar carbohydrates, acids, ketones etc. can be noticed. Similar results can be obtained with other woods, grasses or other cellulose-containing biomasses.

TABLE 1

| Pyrolysis of Raw and Treated Wood | | | |
|---|---|---|---|
| Feed | A-1 popular Wood Mild Hyd. | A-2 Poplar Wood Bench Unit | A-3 Wood Very Mild Hyd. |
| Overall Product Yield | | | |
| Feed Rate, gm/hr | 21.9 | 29.6 | 16.2 |
| Temp ° C. | 501 | 497 | 503 |
| Vapor Res. Time, s | 0.45 | 0.46 | 0.46 |
| Particle Size, μm | −590 | −590 | −590 |
| Moisture, % | 16.5 | 3.3 | 0.83 |
| Cellulose, % | 62.8 | 49.1 | 63.4 |
| Yields, % Wood mf | | | |
| Organic Liquid | 79.6 | 65.8 | 78.3 |
| Water | 0.9 | 12.2 | 5.0 |
| Char | 6.7 | 7.7 | 6.0 |
| Gas | 6.4 | 10.8 | 7.7 |
| | 93.6 | 96.5 | 97.0 |
| Yields of Tar Components % mf Feed | | | |
| Oligosaccharides | 1.19 | 0.7 | 3.80 |
| Cellobiosan | 5.68 | 1.3 | 10.08 |
| Glucose | 1.89 | 0.4 | 1.67 |
| Fructose | 3.89 | 1.31 | 4.00 |
| Glyoxal | 0.11 | 2.18 | 4.10 |
| 1,6 Anh. Glucofuranose | 4.50 | 2.43 | 3.08 |
| Levoglucosan | 30.42 | 3.04 | 15.7 |
| Hydroxyacetaldehyde | 0.37 | 10.03 | 5.35 |
| Formic Acid | 1.42 | 3.09 | 2.54 |
| Acetic Acid | 0.17 | 5.43 | 1.46 |
| Ethylene Glycol | — | 1.05 | 0.43 |
| Acetol | 0.06 | 1.40 | 0.06 |
| Methylglyoxal | 0.38 | 0.65 | 0.41 |
| Formaldehyde | 0.8 | 1.16 | 0.72 |
| Aromatics (lignin) | 19.0 | 16.2 | 18.0 |

TABLE 1-continued

| | Pyrolysis of Raw and Treated Wood | | |
|---|---|---|---|
| Feed | A-1 popular Wood Mild Hyd. | A-2 Poplar Wood Bench Unit | A-3 Wood Very Mild Hyd. |
| Totals | 69.9 | 51.5 | 71.4 |
| % of Pyrolysis Oil | 87.8 | 78.3 | 91.2 |
| Sugars | 47.6 | 9.2 | 38.3 |
| Cellulose Content | 62.0 | — | — |

We claim:

1. A process for the production of fermentable sugars from cellulose-containing biomass, the process comprising the steps of:
   (a) treating the biomass with a dilute acid capable of dissolving hemicellulose wherein the time and temperature of the treatment and the acid strength are selected so as to obtain a liquid phase containing most of the biomass hemi-cellulose and a solid phase containing most of the biomass cellulose.
   (b) separating the cellulose-containing solid phase from the liquid base,
   (c) subjecting the resulting solid phase to rapid pyrolysis at atmospheric pressure and at a temperature in the range 400° C.–600° C. so as to obtain a crude product containing sugars and anhydrosugars, in a reactor where the residence time of pyrolytic vapors is less than about 2 seconds,
   (d) adjusting the water content of the crude product to form an aqueous phase containing fermentable carbohydrates and a water-insoluble phase, and
   (e) separating the aqueous phase from the water-insoluble phase.

2. The process of claim 1 wherein step (a) is carried out using sulfuric acid at concentrations of 0.1–10% by weight and the temperature is 50° C.–150° C. during 1–6 hours.

3. The process of claim 2 wherein the concentration of sulfuric acid is 1–6% by weight and the temperature is 80° C.–100° C.

4. The process of claim 1 wherein the liquid/solid weight ratio in the shape (a) is from 4:1 to 8:1.

5. The process of claim 1 wherein the pyrolysis step is carried out in a fluidized bed reactor in a continuous manner.

6. The process of claim 5 wherein the pyrolysis step is carried out in a fluidized bed comprising an inert solid and the resulting pyrolytic vapors are condensed to yield said crude product.

7. The process of claim 1 wherein the aqueous phase of step (e) is purified by adsorption to remove non-carbohydrate impurities therefrom.

8. The process of claim 1 wherein the solid phase from step (b) is dried and comminuted to particle size of about 5mm or smaller before being subjected to the rapid pyrolysis of step (c).

* * * * *

UNITED STATES PATENT AND TRADEMARK OFFICE
CERTIFICATE OF CORRECTION

PATENT NO.   : 4,880,473
DATED        : November 14, 1989
INVENTOR(S)  : Donald S. Scott and Jan Piskorz It is certified that error appears in the above–identified patent and that said Letters Patent is hereby corrected as shown below:

Abstract, last line, "absorption" should read --adsorption--
Col. 1, line 10, "cellulosE" should read --cellulose--

Col. 3, line 61, "waterinsoluble" should read --water-insoluble--
Col. 4, line 28, "A2indicates" should read --A2 indicates--
Table 1, column A-1, "popular" should read --Poplar--
Table 1, continued, column A-1, "popular" should read --Poplar--
Col. 5, Claim 1(b), second line, "base" should read --phase--
Col. 6, Claim 4, second line, "shape" should read --step--

Signed and Sealed this

First Day of January, 1991

Attest:

HARRY F. MANBECK, JR.

*Attesting Officer*     *Commissioner of Patents and Trademarks*